Patented Feb. 20, 1923.

1,446,160

UNITED STATES PATENT OFFICE.

JOSEPH F. CULLEN, OF MIDVALE, UTAH, ASSIGNOR TO UNITED STATES SMELTING, REFINING AND MINING COMPANY, A CORPORATION OF MAINE.

SOLUBLE ARSENIC COMPOUND AND PROCESS OF MAKING THE SAME.

No Drawing. Application filed May 27, 1920. Serial No. 384,587.

*To all whom it may concern:*

Be it known that I, JOSEPH F. CULLEN, a citizen of the United States, residing at Midvale, in the county of Salt Lake and State of Utah, have invented certain new and useful Improvements in Soluble Arsenic Compounds and Processes of Making the Same; and I do hereby declare the following to be a full, clear, and exact description of the invention, such as will enable others skilled in the art to which it appertains to make and use the same.

This invention relates to a soluble arsenic compound and to the process of making the same.

The object of the invention is to produce a soluble arsenic compound from arsenious oxide, having properties which render it particularly adapted for use in herbicidal sprays, dips, poison baits and other poisons.

The more readily soluble arsenic compounds which have heretofore been used as the basis for herbicidal sprays and similar poisons have consisted largely of arsenites of which sodium arsenite may be taken as an example. The sodium arsenite has generally consisted of the normal sodium salt of ortho-arsenious acid, together with mixtures of this salt with meta sodium arsenite and with the intermediate sodium arsenites lying between the normal and meta salts. The exact composition of the sodium arsenite mixture is dependent upon the ratio of arsenious oxide to alkali. For example, assuming that caustic soda is used, the ratio of arsenious oxide to caustic soda by weight varies from 198 to 240 in the case of the ortho sodium arsenite to 198 to 80 in the case of the meta sodium arsenite.

Inasmuch as the effective poisoning ingredient in these compounds or the solutions thereof, is the arsenious oxide, the value of the compounds or solutions depends directly upon the percentage of arsenious oxide therein. An important object sought to be attained in the preparation of these herbicidal compounds is to obtain a maximum amount of arsenious oxide in solution. Heretofore, the maximum amount has been about 30% by weight and to secure this amount at least equal molecular proportions of alkali to arsenious oxide have been required, or approximately 1 part by weight of alkali to 2½ parts by weight of arsenious oxide.

One of the features of the present invention resides in the production of a completely soluble arsenic compound from arsenious oxide in which a less quantity of alkali is required to obtain the solution of a quantity of arsenious oxide materially greater than the prior maximum of 30%.

The general practice in the manufacture and sale of the previous sodium arsenite compounds for herbicidal sprays and the like, has been to make up and ship solutions of the arsenite compounds of concentrations varying up to 30% by weight. It is obviously desirable that such solutions should be as concentrated as practicable in order that they may occupy a minimum amount of space and that the freight charges upon water contained therein be reduced to a minimum. Attempts to concentrate these prior solutions of sodium arsenite beyond a point where the solution contains approximately 30% of arsenious oxide by weight, have resulted in the crystallization of the sodium arsenite from the solution, and the collection of the solid crystals in the bottom thereof.

A further feature of the present invention resides in the provision of a soluble arsenic compound of arsenious oxide capable of forming permanent solutions having concentrations of arsenious oxide materially greater than 30%.

These and other features of the invention will be pointed out in the specification and in the claims.

The preferred process for producing a soluble arsenic compound embodying the present invention, is described as follows:

2500 pounds of caustic soda are added to 7500 pounds of water in a suitable container, and immediately thereafter 10,000 pounds of a good grade of white arsenic are added. The resulting chemical reactions furnish sufficient heat to boil the water and to dissolve all of the arsenious oxide. The solution may be agitated to assist in the solution of the arsenious oxide. With the above quantities of ingredients approximately 1,250 gallons of the concentrated solution containing dissolved arsenious oxide are obtained. This solution analyzes approximately 50% arsenious oxide, 37½% of water and 12½% of alkali expressed as caustic soda. This solution contains approximately 8 pounds of arsenious oxide to the gallon, whereas the most concentrated of prior solutions contain not over 4 pounds of soluble arsenious oxide to the gallon. It will be observed that the solution of 8 pounds of arsenious oxide per gallon has been accomplished by the use of approximately 2 pounds of caustic soda, whereas in prior solutions only 4 pounds of arsenious oxide were dissolved by the use of a nearly equal quantity of caustic soda.

Usually the concentrated solution of arsenious oxide containing approximately 50% thereof will be shipped directly to the place of use where it may be further diluted to meet the needs of the particular use. Such concentrated solution will not crystallize or otherwise solidify, even at temperatures in the neighborhood of 0° F. In this respect this solution is superior to previous solutions of a concentration of arsenious oxide in the neighborhood of 30% by weight, as all commercial types of which I am aware contain a considerable quantity of solid crystals in the bottom thereof.

When it is desired to use unrefined arsenious oxide, it may be necessary to heat the solution in order to facilitate and hasten the solution of the arsenious oxide. Also other alkaline salts may be used such as soda ash, or bicarbonate of sodium, in which case it is necessary to heat the solution.

In some instances, particularly when it is desired to ship the compound to a distant point, it may be desirable to produce the solid soluble compound from the concentrated solution. For this purpose the concentrated solution is evaporated and the compound obtained therefrom. In some instances it may be desirable and economical to even evaporate the solution to dryness. The solid compound thus obtained is completely soluble in water.

It will be understood that the quantities of ingredients set forth in the above described process are to be employed when it is desired to produce a solution containing approximately 50% by weight of arsenious oxide in which the ratio of arsenious oxide to caustic soda is approximately 4:1. In some instances it may be desirable to increase the ratio of arsenious oxide to alkali and solutions have been prepared in which a ratio by weight of 5½ parts arsenious oxide to 1 part of caustic soda or a molecular ratio of 11:10 was employed.

The term "compound" as used in the specification and claims is intended to include both compounds and mixtures. It will also be understood that the invention contemplates the soluble compounds formed by the reaction of arsenious oxide and alkali and water in which the molecular ratio of arsenious oxide to alkali exceeds 1:1.

Having thus described the invention what is claimed is:—

1. A water solution for herbicidal sprays and the like of the reaction product of arsenious oxide and caustic soda in which the percentage of soluble arsenic contained in the solution when cooled exceeds, when expressed as arsenious oxide, 30% of the weight of the solution.

2. The process of forming a concentrated solution of a soluble arsenic compound which consists in dissolving arsenious oxide in a solution of caustic soda and subsequently cooling the solution, the amount of arsenious oxide dissolved being such that the molecular ratio of the arsenious oxide to caustic soda in the rsulting solution when cool exceeds 1:1.

3. The process of forming a solution of arsenious oxide of a concentration exceeding 30% when cool of dissolved arsenious oxide which consists in introducing a quantity of material containing a definite weight of arsenious oxide into a quantity of water of less weight to which a still less weight of an alkali of the alkali metal group has been added and maintaining the solution heated until substantially all of the arsenious oxide is dissolved.

4. The process of forming a soluble compound containing over 30% of soluble arsenious oxide which consists in introducing a definite weight of arsenious oxide into a less weight of water to which a still less weight of an alkali of the alkali metal group has been added, maintaining the solution heated until substantially all of the arsenious oxide is dissolved, separating the solution from any undissolved material and evaporating the solution to obtain the compound.

JOSEPH F. CULLEN.